(12) United States Patent
Karlsson

(10) Patent No.: US 10,697,565 B2
(45) Date of Patent: Jun. 30, 2020

(54) SEAL

(71) Applicant: Roxtec AB, Karlskrona (SE)

(72) Inventor: Andreas Karlsson, Listerby (SE)

(73) Assignee: Roxtec AB, Karlskrona (SE)

( * ) Notice: Subject to any disclaimer, the term of this patent is extended or adjusted under 35 U.S.C. 154(b) by 0 days.

(21) Appl. No.: 15/558,138

(22) PCT Filed: Mar. 11, 2016

(86) PCT No.: PCT/SE2016/050200
§ 371 (c)(1),
(2) Date: Sep. 13, 2017

(87) PCT Pub. No.: WO2016/148625
PCT Pub. Date: Sep. 22, 2016

(65) Prior Publication Data
US 2018/0045338 A1 Feb. 15, 2018

(30) Foreign Application Priority Data
Mar. 17, 2015 (SE) ........................ 1550319

(51) Int. Cl.
*F16L 5/02* (2006.01)
*F16L 5/08* (2006.01)
*H02G 3/22* (2006.01)

(52) U.S. Cl.
CPC .................. *F16L 5/08* (2013.01); *H02G 3/22* (2013.01); *F16L 2201/10* (2013.01)

(58) Field of Classification Search
CPC .......... F16J 15/02; F16J 15/021; F16J 15/022; F16J 15/06; F16J 15/10; F16J 15/102;
(Continued)

(56) References Cited

U.S. PATENT DOCUMENTS 625,155 A * 5/1899 Dresser ................. F16L 17/025
277/607
1,603,991 A 10/1926 Smithers
(Continued)

FOREIGN PATENT DOCUMENTS

CN 101783489 A 7/2010
DE 29508645 U1 11/1995
(Continued)

OTHER PUBLICATIONS

International Search Report and Written Opinion for PCT/SE2016/050200 dated May 4, 2016.
(Continued)

*Primary Examiner* — Gilbert Y Lee
(74) *Attorney, Agent, or Firm* — Merchant & Gould P.C.

(57) ABSTRACT

The present invention concerns a seal comprising a front fitting (1, 21, 41), a rear fitting (2, 22, 42) and a compressible part (3, 23, 43). The compressible part (3, 23, 43) is placed between the front fitting (1, 21, 41) and the rear fitting (2, 22, 42). The seal is a transition for a conduit through a wall (16), wherein the conduit is received in a central through opening of the seal and wherein the seal is received in an opening of the wall (16). In a mounted seal the compressible part (3, 23, 43) seals inwards against the conduit and outwards against an inner surface of the opening of the wall (16). The axial extension of the compressible part (3, 23, 43) is larger than the thickness of the wall (16) at the opening of the wall (16).

11 Claims, 4 Drawing Sheets

(58) Field of Classification Search
CPC .......... F16J 15/12; F16J 15/122; F16J 15/128; F16L 2201/10; F16L 5/00; F16L 5/02; F16L 5/08; F16L 5/10; H02G 3/22
See application file for complete search history.

(56) References Cited

U.S. PATENT DOCUMENTS

| | | | | |
|---|---|---|---|---|
| 3,104,120 | A * | 9/1963 | Ahlport | F16L 41/14 174/51 |
| 3,408,096 | A * | 10/1968 | Stephenson | F16L 17/04 277/607 |
| 3,779,585 | A | 12/1973 | Handzlik | |
| 5,117,482 | A * | 5/1992 | Hauber | H05B 3/148 239/135 |
| 5,810,400 | A | 9/1998 | Youngs | |
| 5,967,567 | A * | 10/1999 | Nordstrom | F16L 5/08 285/139.1 |
| 2014/0265157 | A1 * | 9/2014 | Mukai | F16L 5/08 277/606 |

FOREIGN PATENT DOCUMENTS

| | | |
|---|---|---|
| DE | 202011102722 UI | 9/2011 |
| DE | 202012001199 UI | 5/2013 |
| EP | 1211450 A1 | 6/2002 |
| EP | 1628376 A2 | 2/2006 |
| JP | S50-15419 | 2/1975 |
| JP | H02-67190 A | 3/1990 |
| WO | WO 03/025446 A1 | 3/2003 |
| WO | WO 2004/070250 A1 | 8/2004 |

OTHER PUBLICATIONS

Search Report for European Patent Application No. 16765342.7, dated Nov. 14, 2018.
Office Action and Search Report for Chinese Patent Application No. 201680016128.4, dated May 8, 2019.
Japanese Office Action issued in corresponding JP Application No. 2017-548391 dated Feb. 4, 2020 (English Translation).
European Office Action issued in corresponding European Application No. 16765342.7 dated Feb. 17, 2020 (4 pages).

* cited by examiner

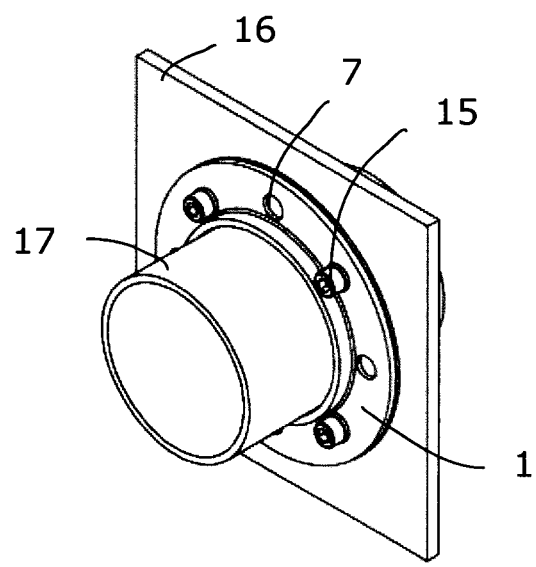
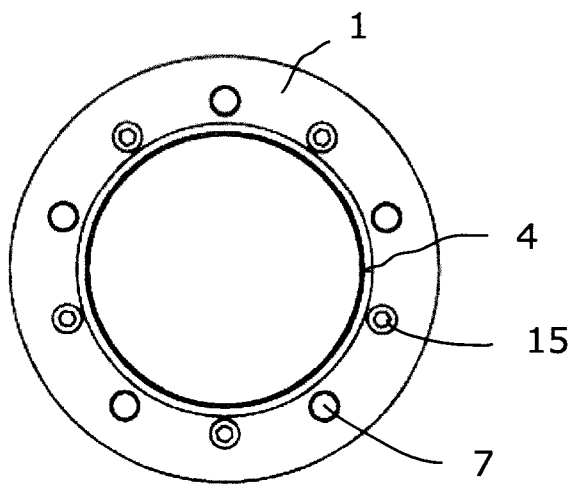
Fig. 1
Fig. 2
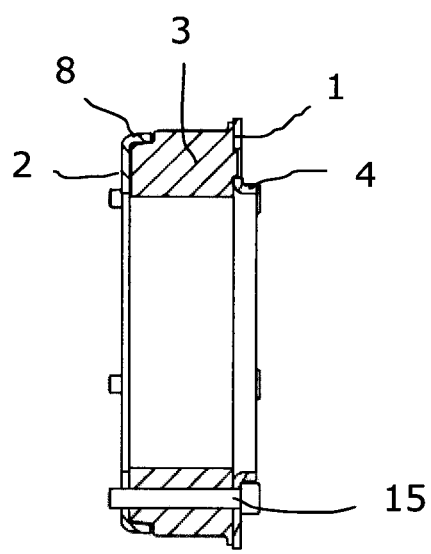
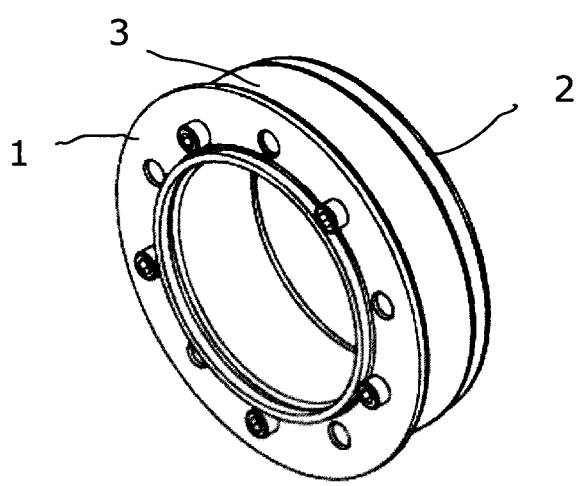
Fig. 3
Fig. 4

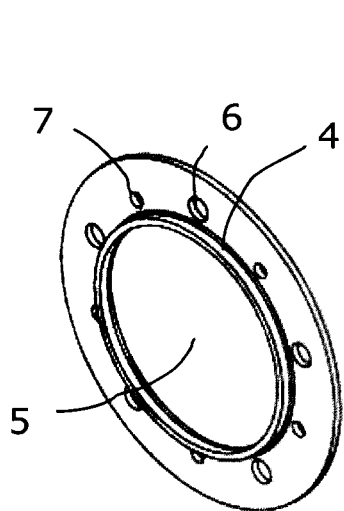
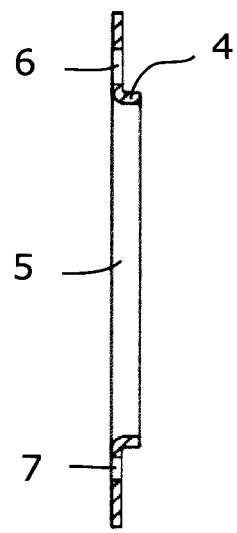
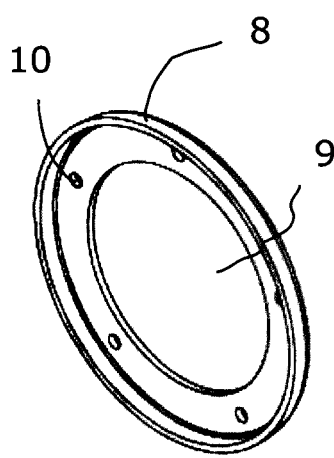
Fig. 5
Fig. 6
Fig. 7
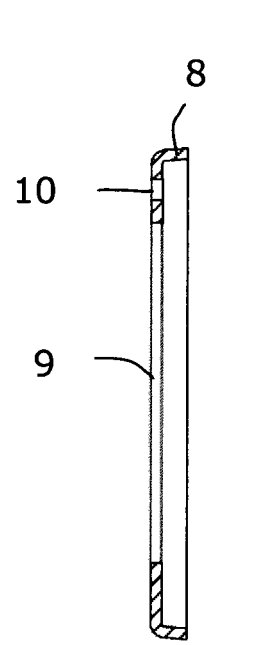
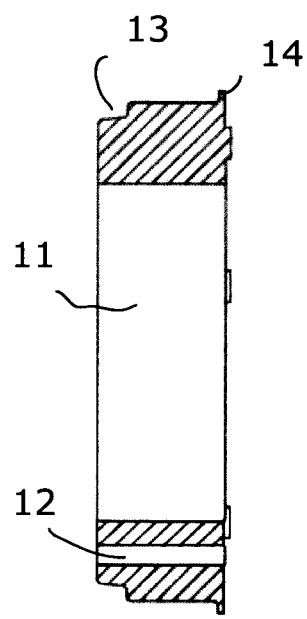
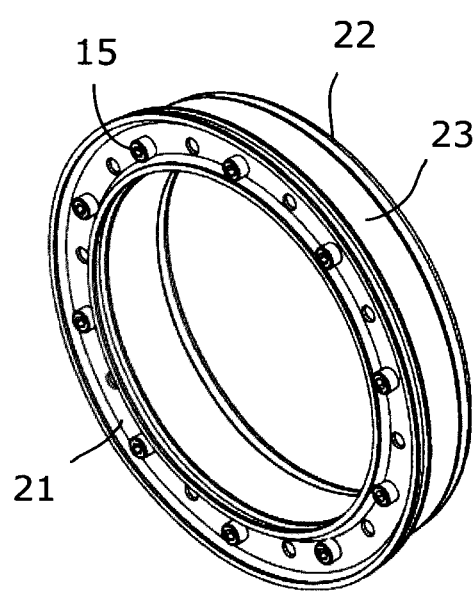
Fig. 8
Fig. 9
Fig. 10

SEAL

This application is a National Stage Application of PCT/SE2016/050200, filed 11 Mar. 2016, which claims benefit of Swedish Patent Application No. 1550319-6, filed 17 Mar. 2015, which applications are incorporated herein by reference. To the extent appropriate, a claim of priority is made to each of the above disclosed applications.

TECHNICAL FIELD

The present invention concerns a seal for a conduit going through an opening in a wall.

PRIOR ART

A seal of this kind is a transit or lead-through for a conduit, such as a pipe or cable, going through an opening in a wall.

The seal or transition should seal both inwardly against the conduit going through the wall and outwardly against the inner surface of the opening of the wall. Transitions or seals are previously known, where an elastic sealing material is placed between two fittings. The fittings are arranged movable towards each other, normally by means of a screw arrangement, whereby the sealing material placed between the fittings will be compressed in an axial direction. By the compression in axial direction the sealing material will expand in radial direction both inwards and outwards, if allowed.

In the prior art it is common to have one sealing part arranged to seal inwardly against the conduit and one sealing part sealing outwardly against the inner surface of the opening of the wall. One example of such a solution is shown in WO2004/070250.

Seals of this kind are used in many different environments, such as for cabinets, technical shelters, junction boxes and machines and also decks and bulkheads of ships. They are used in different industrial environments, such as automotive, telecom, power generation and distribution as well as marine and offshore. The seal may have to seal against fluid, gas, fire, rodents, termites, dust, moisture etc.

SUMMARY

One object of the present invention is to have a less complex solution, which is relatively easy to install. It should also be possible to use for a relatively wide diameter range of the conduit to be received.

According to one aspect of the present invention the seal comprises a front fitting, a rear fitting and a compressible part placed between the front fitting and the rear fitting. The seal forms a transition for a conduit, such as a pipe, through a wall and is to be placed in an opening of the wall. The conduit is received in a central through opening of the seal. In the mounted state the seal seals inwardly against the conduit and outwardly against an inner surface of the opening of the wall. The axial extension of the compressible part is larger than the thickness of the wall at the opening of the wall.

By the seal of the present invention installation from one side is possible. Furthermore, by tightening screws connecting the front and rear fittings, the compressible part will be compressed both inwards towards the conduit and outwards towards the inner surface of the opening of the wall, in the same sequence. The compressible part also functions to fasten the seal at the opening of the wall.

The seal will be held at the wall in use, in that the wall will be placed between the compressible part and the front fitting.

Depending for instance on the dimensions of the conduit to be received, the seal will be exposed to forces of different strengths. Generally speaking, the larger diameter of the conduit the larger the forces will be. Therefore, the seal has somewhat varying designs depending on the intended use. In this description three different designs are shown, covering a wide range of the outer diameters of the conduit to be received.

Further objects and advantages of the present invention will be obvious to a person skilled in the art when reading the detailed description below of at present preferred embodiments.

BRIEF DESCRIPTION OF THE DRAWINGS

The present invention will be described further below by way of example and with reference to the enclosed drawings. In the drawings:

FIG. 1 is a perspective view of a seal according to the present invention, mounted in an opening of a wall and receiving a pipe;

FIG. 2 is a plan view of a first embodiment of the seal of the present invention;

FIG. 3 is a sectional view of the seal of FIG. 2;

FIG. 4 is a perspective view of the seal of FIGS. 2 and 3;

FIG. 5 is a perspective view of a front fitting of the first embodiment;

FIG. 6 is a sectional view of the front fitting of FIG. 5;

FIG. 7 is a perspective view of a rear fitting of the first embodiment;

FIG. 8 is a sectional view of the rear fitting of FIG. 7;

FIG. 9 is a sectional view of a compressible part of the first embodiment;

FIG. 10 is a perspective view of a second embodiment of the seal of the present invention;

DETAILED DESCRIPTION OF EMBODIMENTS

Figure 11:
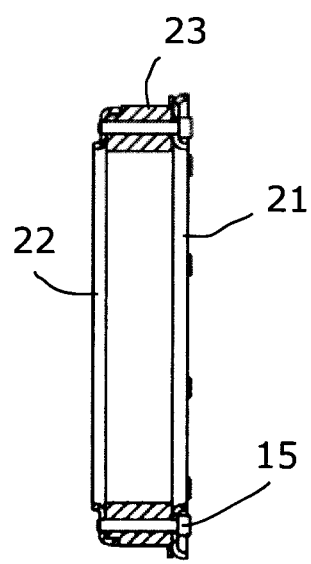
FIG. 11 is a sectional view of the seal of FIG. 10.

The present invention has been developed for a pipe seal or a pipe transition, but it could also be used as a transition for a relatively solid cable. For ease of description the term "conduit" will generally be used, and it is to be construed to include both pipe and cable. As used in this description "axial", "radial" and similar expressions are in relation to a conduit received in the seal. The seal is to be mounted from one side only and as used in this description the expression "front" refers to the side from which the seal is to be mounted. Correspondingly the expression "rear" refers to the opposite side.

Depending on the outer diameter of a conduit to be received, the different parts of the seal have slightly different designs. In the shown embodiments there are three different sizes, which will be referred to as small, medium and large sizes below.

The seal, whether it is of small, medium or large size, comprises three main parts, a front fitting 1, 21, 41 a rear fitting 2, 22, 42 and a compressible part 3, 23, 43 to be placed between the front fitting 1, 21, 41 and the rear fitting 2, 22, 42. In use the front fitting 1, 21, 41 and the rear fitting 2, 22, 42 are moved toward each other by means of a number of screws 15, whereby the compressible part 3, 23, 43 will be compressed in axial direction and expand in radial direction. The expansion in radial direction for the compressible part 3, 23, 43 is both inwardly and outwardly, if allowed. In FIG. 1 a seal of medium size is shown mounted in an opening in a wall 16. Inside the seal a pipe 17 is received. By the radial expansion the pressure of the compressible part 3, 23, 43 will increase against the pipe 17 and the inner surface of the opening of the wall 16.

In the shown embodiments the seals and its front fittings 1, 21, 41, rear fittings 2, 22, 42 and compressible parts 3, 23, 43 all have a circular configuration in cross section. In other embodiments the outer configuration of the seal or any of its main parts may have another configuration, such as rectangular, polygonal or oval.

The seal of medium size and its different main parts are shown in FIGS. 1-9. The front fitting 1 of the seal of medium size has an inner folded edge 4 at an inner central through opening 5 of the front fitting 1. The folded edge 4 protrudes from the front fitting 1 in a direction about perpendicular to the adjacent part of the front fitting 1. In use the folded edge 4 is to be directed away from the rear fitting 2. The inner through opening 5 is placed inside the folded edge 4 of the front fitting 1. The folded edge 4 goes all the way around the inner through opening 5 and, thus, the folded edge 4 will in practice form the outer circumference of said inner through opening 5. The front fitting 1 has also a number of further through openings 6, to receive fastening means. The fastening means may be screws 15, as stated above. The front fitting 1 has also a number of indication openings 7. Said indication openings 7 are used for indication of compression and/or for identification. When the compressible part 3 is compressed between the front fitting 1 and the rear fitting 2, the compressible part 3 will bulge into said indication openings 7. Said bulging of the compressible part 3 into the indication openings 7 will give an indication of the compression force when the screws 15 are tightened. By giving each compressible part 3 a specific identification, it will for instance be possible to establish a manufacturing site, a specific manufacturing batch etc. in case of problem. Such specific identification can be placed to be positioned at one of the indications openings 7 in use. The number of indication openings 7 may vary, from one an upwards.

The rear fitting 2 has an outer folded edge 8 at the outer circumference. The folded edge 8 of the rear fitting 2 is about perpendicular to the adjacent part of the rear fitting 2. In use the folded edge 8 of the rear fitting 2 is to be directed towards the first fitting 1. The rear fitting 2 has a central through opening 9. The rear fitting 2 also has a number of through openings 10 for receiving the screws 15. The through openings 10 have threads for cooperation with the threads of the screws 15.

The compressible part 3 is normally made of rubber, but in practice any compressible material may be used. The compressible part 3 has a central through opening 11 and a number of through openings 12 to receive the screws 15. The compressible part 3 has an outer circumferential recess 13 at the end to be facing the rear fitting 2. The outer recess 13 of the compressible part 3 is to receive the outer folded edge 8 of the rear fitting 2. At the side to be facing the front fitting 1, the compressible part 3 has an outer circumferential lip 14. The outer lip 14 is perpendicular to the compressible part 3 and is to be placed between the front fitting 1 and the wall 16 when the seal is mounted. For the seal to function in the intended way, the height of the compressible part 3 should be larger than the thickness of the wall 16 in which the seal is to be mounted.

When assembling the seal the rear fitting 2 is placed with the outer folded edge 8 in the outer recess 13 at one end of the compressible part 3. The front fitting 1 is placed at the other end of the compressible part 3. For the assembly the through openings 6, for the screws 15, of the front fitting 1 are placed in line with the through openings 12 of the compressible part 3 and the through openings 10 of the rear fitting 2. The screws 15 are then inserted through said trough openings 6, 12, 10 of the front fitting 1, the compressible part 3 and the rear fitting 2, respectively. The screws 15 are screwed into the threads of the openings 10 of the rear fitting 2 long enough to keep the seal together but without any substantial compressing of the compressible part 3. In the assembled seal the central through opening 5 of the front fitting 1 will be in line with the central through opening 11 of the compressible part 3 and the central through opening 9 of the rear fitting 2. The assembled seal will thereby have a central through opening, formed by said central through openings 5, 11, 9 of the front fitting 1, compressible part 3, and the rear fitting 2, respectively.

For the shown seal of medium size there are five screws 15, but a person skilled in the art realises that any number of screws can be used.

In other embodiments the compressible part will have a design without any outer circumferential recess and/or any outer circumferential lip. Thus, in one embodiment the compressible part has the form of a tube with a straight outer circumference. At assembly the compressible part having no outer circumferential recess is pressed into the area inside the outer folded edge 8 of the rear fitting 2.

Figure 12:
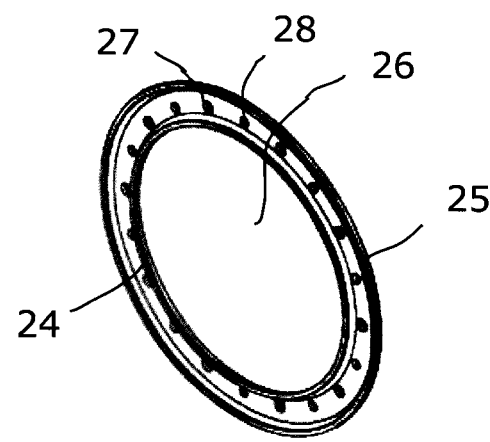
FIG. 12 is a perspective view of a front fitting of the second embodiment.
Figure 13:
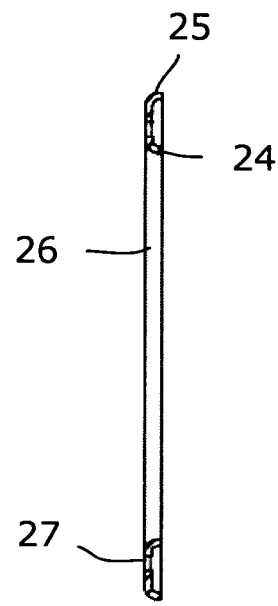
FIG. 13 is a sectional view of the front fitting of FIG. 12.
Figure 14:
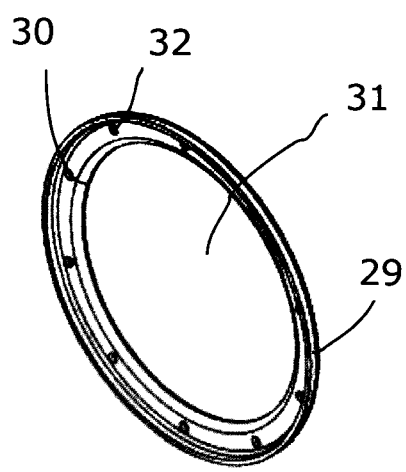
FIG. 14 is a perspective view of a rear fitting of the second embodiment.
Figure 15:
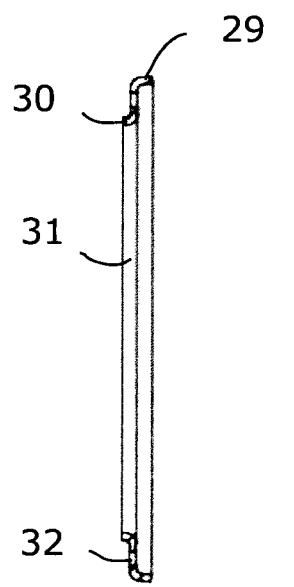
FIG. 15 is a sectional view of the rear fitting of FIG. 14.
Figure 16:
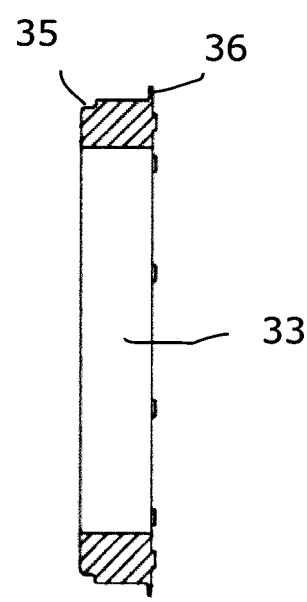
FIG. 16 is a sectional view of a compressible part of the second embodiment.

The seal of large size and its different main parts are shown in FIGS. 10-16. The front fitting 21 of the seal of medium size has an inner folded edge 24 at an inner central through opening 25 of the front fitting 21 and an outer folded edge 25 at the outer periphery of the front fitting 21. The folded edges 24, 25 protrude from the front fitting 21 in a direction about perpendicular to the adjacent part of the front fitting 21. In use the folded edges 24, 25 are to be directed away from the rear fitting 22. The inner through opening 26 is placed inside the inner folded edge 24 of the front fitting 21. The inner folded edge 24 goes all the way around the inner through opening 26 and, thus, the inner folded edge 24 will in practice form the outer circumference of said inner through opening 26. The outer folded edge 25 goes all the way around the front fitting 21. The front fitting 21 has also a number of through openings 27, to receive fastening means. The fastening means may be screws 15, as stated above. The front fitting 21 has also a number of indication openings 28. Said indication openings 28 are used for indication of compression and/or for identification as indicated above for the seal of medium size. The number of indication openings 28 may vary, from one an upwards.

The rear fitting 22 has an outer folded edge 29 at the outer circumference, which outer folded edge 29 is about perpendicular to the adjacent part of the fitting 22. In use the outer folded edge 29 of the rear fitting 22 is to be directed towards the first fitting 21. The rear fitting 22 has also an inner folded edge 30, which is about perpendicular to the adjacent part of the rear fitting 22. In use the inner folded edge 30 of the rear fitting 22 is to be directed away from the front fitting 21. The rear fitting 22 has a central through opening 31. The inner folded edge 30 of the rear fitting 22 goes all the way around the central through opening 31 of the rear fitting 22. The rear fitting 22 also has a number of through openings 32 for receiving the screws 15. The through openings 32 have threads for cooperation with the threads of the screws 15.

The function of the folded inner edge 30 is mainly to strengthen the rear fitting 22. In some embodiments the rear fitting 22 has no inner folded edge 30, for instance if the extra strength is not needed.

The compressible part 23 is normally made of rubber, but in practice any compressible material may be used. The compressible part 23 has a central through opening 33 and a number of through openings to receive the screws 15. The compressible part 23 has an outer circumferential recess 35 at the end to be facing the rear fitting 22. The outer recess 35 of the compressible part 23 is to receive the outer folded edge 29 of the rear fitting 22. At the side to be facing the front fitting 21, the compressible part 23 has an outer circumferential lip 36. The outer lip 36 is perpendicular to the compressible part 23 and is to be placed between the front fitting 21 and the wall 16 when the seal is mounted. For the seal to function in the intended way, the height of the compressible part 23 should be larger than the thickness of the wall 16 in which the seal is to be mounted.

When assembling the seal the rear fitting 22 is placed with the outer folded edge 29 in the outer recess 35 at one end of the compressible part 23. The front fitting 21 is placed at the other end of the compressible part 23. For the assembly the through openings 27, for the screws 15, of the front fitting 21 are placed in line with the through openings of the compressible part 23 and the through openings 32 of the rear fitting 22. The screws 15 are then inserted through said trough openings 27, 32 of the front fitting 21, the compressible part 23 and the rear fitting 22, respectively. The screws 15 are screwed into the threads of the openings 32 of the rear fitting 22 long enough to keep the seal together but without any substantial compressing of the compressible part 23. In the assembled seal the central through opening 26 of the front fitting 21 will be in line with the central through opening 33 of the compressible part 23 and the central through opening 31 of the rear fitting 22. The assembled seal will thereby have a central through opening, formed by said central through openings 26, 33, 31 of the front fitting 21, compressible part 23, and the rear fitting 22, respectively.

For the shown seal of medium size there are ten screws 15, but a person skilled in the art realises that any number of screws can be used.

In other embodiments the compressible part will have a design without any outer circumferential recess and/or any outer circumferential lip. Thus, in one embodiment the compressible part has the form of a tube with a straight outer circumference. At assembly the compressible part having no outer circumferential recess is pressed into the area inside the outer folded edge 29 of the rear fitting 22.

Figure 17:
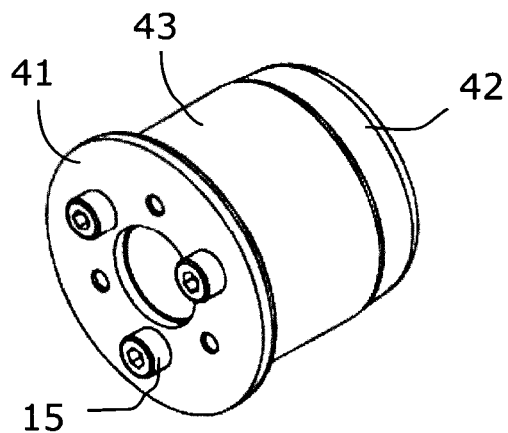
FIG. 17 is a perspective view of a third embodiment of the seal of the present invention.
Figure 18:
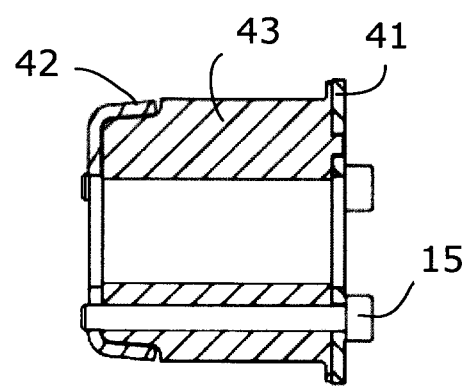
FIG. 18 is a sectional view of the seal of FIG. 17.
Figure 19:
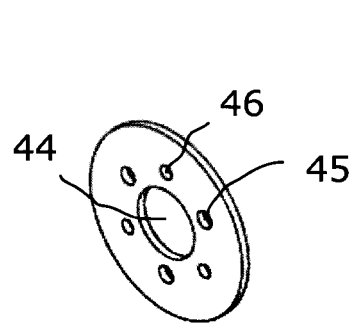
FIG. 19 is a perspective view of a front fitting of the third embodiment.
Figure 20:
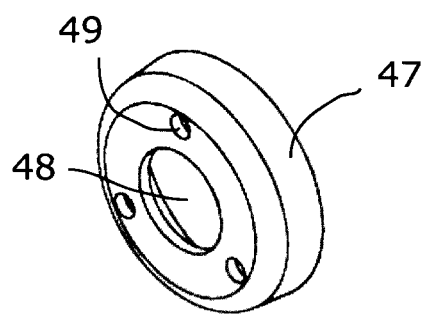
FIG. 20 is a perspective view of a rear fitting of the third embodiment.
Figure 21:
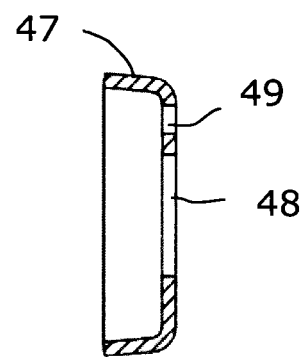
FIG. 21 is a sectional view of the rear fitting of FIG. 20.
Figure 22:
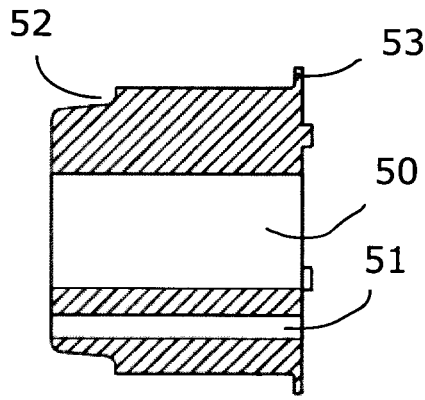
FIG. 22 is a sectional view of a compressible part of the third embodiment.

The seal of small size and its different main parts are shown in FIGS. 17-22. The front fitting 41 of the seal of small size is straight and has no folded edges in contrast to the front fittings 1, 21 of the other embodiments. The front fitting 41 has an inner central through opening 44. The front fitting 41 has also a number of through openings 45, to receive fastening means. The fastening means may be screws 15, as stated above. The front fitting 41 has also a number of indication openings 46. Said indication openings 46 are used for indication of compression and/or for identification as indicated above for the seal of medium size. The number of indication openings 46 may vary, from one an upwards.

The rear fitting 42 has an outer folded edge 47 at the outer circumference, which outer folded edge 47 is about perpendicular to the adjacent part of the rear fitting 42. In use the outer folded edge 47 of the rear fitting 42 is to be directed towards the first fitting 41. The rear fitting 42 has a central through opening 48. The rear fitting 42 also has a number of through openings 49 for receiving the screws 15. The through openings 49 have threads for cooperation with the threads of the screws 15.

The compressible part 43 is normally made of rubber, but in practice any compressible material may be used. The compressible part 43 has a central through opening 50 and a number of through openings 51 to receive the screws 15. The compressible part 43 has an outer circumferential recess 52 at the end to be facing the rear fitting 42. The outer recess 52 of the compressible part 43 is to receive the outer folded edge 47 of the rear fitting 42. At the side to be facing the front fitting 41, the compressible part 43 has an outer circumferential lip 53. The outer lip 53 is perpendicular to the compressible part 43 and is to be placed between the front fitting 41 and the wall 16 when the seal is mounted. For the seal to function in the intended way, the height of the compressible part 43 should be larger than the thickness of the wall 16 in which the seal is to be mounted.

When assembling the seal the rear fitting 42 is placed with the outer folded edge 47 in the outer recess 52 at one end of the compressible part 43. The front fitting 41 is placed at the other end of the compressible part 43. For the assembly the through openings 45, for the screws 15, of the front fitting 41 are placed in line with the through openings 51 of the compressible part 43 and the through openings 49 of the rear fitting 42. The screws 15 are then inserted through said trough openings 45, 51, 49 of the front fitting 41, the compressible part 43 and the rear fitting 42, respectively. The screws 15 are screwed into the threads of the openings 49 of the rear fitting 42 long enough to keep the seal together but without any substantial compressing of the compressible part 43. In the assembled seal the central through opening 44 of the front fitting 41 will be in line with the central through opening 50 of the compressible part 43 and the central through opening 48 of the rear fitting 42. The assembled seal will thereby have a central through opening, formed by said central through openings 44, 50, 48 of the front fitting 41, compressible part 43, and the rear fitting 42, respectively.

For the shown seal of medium size there are three screws 15, but a person skilled in the art realises that any number of screws can be used.

In other embodiments the compressible part will have a design without any outer circumferential recess and/or any outer circumferential lip. Thus, in one embodiment the compressible part has the form of a tube with a straight outer circumference. At assembly the compressible part having no outer circumferential recess is pressed into the area inside the outer folded edge 47 of the rear fitting 42.

The seal of the present invention is to be used in connection with a conduit, such as a pipe 17, going through an opening in a wall 16. In use the seal is placed in an assembled condition surrounding the conduit and is then inserted into the opening of the wall 16. The radial play between the seal and the opening of the wall 16 is normally 1-2 mm. The radial play between the conduit and the inner circumference of the seal is normally also 1-2 mm. The seal is inserted with the rear fitting 2, 22, 42 first and is pushed into the opening until the front fitting 1, 21, 41 is placed on the wall 16. The outer diameter of the front fitting 1, 21, 41 is larger than the inner diameter of the opening of the wall 16. The outer diameters of the rear fitting 2, 22, 42 and the compressible part 3, 23, 43 respectively, are somewhat smaller than the inner diameter of the opening of the wall 16. With the seal fully inserted into the opening of the wall, the screws 15 are tightened. By tightening the screws 15, the rear fitting 2, 22, 42 and the front fitting 1, 21, 41 will be moved towards each other, thereby compressing the compressible part 3, 23, 43 in axial direction. By the compression in axial direction the compressible part 3, 23, 43 will expand radially, both inwards towards the conduit and outwardly towards the inner surface of the opening of the wall 16. The compressible part 3, 23, 43 will expand outwardly under the rear side of the wall 16 as there is a distance between the rear fitting 2, 22, 42 and the wall 16. Thus, a portion of the compressible part 3, 23, 43 will abut the rear side of the wall 16 around the opening of the wall 16. The compressible part 3, 23, 43 will normally also expand somewhat in between the wall 16 and the front fitting 1, 21, 41 when compressed in axial direction. Thus, the seal will seal both against the conduit and against the inner surface of the opening of the wall 16. The seal will be kept in place by means of the front fitting 1, 21, 41 and the portion of the compressible part 3, 23, 43 that has expanded on the rear side of the wall 16.

The compressible part 3, 23, 43 will also expand into the through openings 7, 28, 46 of the front fitting 1, 21, 41 not receiving any screw 15. This expansion into said through openings can be used as a visual indication of the compression. It is also possible to place marking on the compressible part 3, 23, 43 visible through at least one of the through openings 7, 28, 46 not receiving any screw 15. Such marking can be used for identification of maker, production batch etc. in case of malfunction, complaints etc.

In one embodiment nuts are fixed to the rear fitting 2, 22, 42 such as by welding or soldering, at the through openings 10, 32, 49 of the rear fitting 2, 22, 42 for cooperation with the screws 15.

In one example the three sizes of the seal described above cover conduit sizes having an outer diameter in the interval from 12 mm to 222 mm.

The invention claimed is:

1. A seal comprising a front fitting, a rear fitting, and a compressible part placed between the front fitting and the rear fitting, said seal is a transition for a conduit through a wall, wherein the seal has a center axis and a central through opening of the seal located through the center axis of the seal, and the conduit is received in the central through opening of the seal and wherein the seal is received in an opening of the wall, wherein the compressible part seals inwardly against the conduit and outwardly against an inner surface of the opening of the wall, and an axial extension of the compressible part is larger than a thickness of the wall at the opening of the wall, wherein the front fitting has an inner folded edge at the outer circumference of the through opening of the front fitting, which folded edge is perpendicular to the adjacent part of the front fitting and is directed away from the rear fitting in the assembled seal.

2. The seal of claim 1, wherein the rear fitting has a circumferential outer folded edge, which folded edge is perpendicular to the adjacent part of the rear fitting and is directed towards the front fitting in the assembled seal.

3. The seal of claim 2, wherein one end of the compressible part is placed inside the outer folded edge of the rear fitting.

4. The seal of claim 1, wherein the compressible part has an outer circumferential recess at one end and/or an outer circumferential lip at the opposite end, which lip is perpendicular to the compressible part.

5. The seal of claim 1, wherein the seal is assembled by means of screws going through openings of the front fitting, openings of the compressible part and openings of the rear fitting, which openings of the rear fitting are threaded for cooperation with threads on the screws and wherein the screws act to force the rear fitting and the front fitting toward each other when the screws are tightened.

6. The seal of claim 1, wherein the central through opening of the seal is formed of a central through opening of the front fitting, a central through opening of the compressible part and a central through opening of the rear fitting.

7. The seal of claim 1, wherein the front fitting has one or more indication openings.

8. The seal of claim 1, wherein the front fitting has an outer folded edge at the outer circumference of the front fitting and which folded edge is perpendicular to the adjacent part of the front fitting.

9. The seal of claim 1, wherein the conduit is a pipe.

10. A seal comprising a front fitting, a rear fitting, and a compressible part placed between the front fitting and the rear fitting, said seal is a transition for a conduit through a wall, wherein the seal has a center axis and a central through opening of the seal located through the center axis of the seal, and the conduit is received in the central through opening of the seal and wherein the seal is received in an opening of the wall, wherein the compressible part seals inwardly against the conduit and outwardly against an inner surface of the opening of the wall, and an axial extension of the compressible part is larger than a thickness of the wall at the opening of the wall, wherein the front fitting has an outer folded edge at the outer circumference of the front fitting and which folded edge is perpendicular to the adjacent part of the front fitting wherein the rear has an inner folded edge surrounding the central through opening, and wherein the inner folded edge is perpendicular to the adjacent part of the rear fitting and wherein the inner folded edge is directed away from the front fitting in the assembled seal.

11. A seal comprising a front fitting, a rear fitting, and a compressible part placed between the front fitting and the rear fitting, said seal is a transition for a conduit through a wall, wherein the seal has a center axis and a central through opening of the seal located through the center axis of the seal, and the conduit is received in the central through opening of the seal and wherein the seal is received in an opening of the wall, wherein the compressible part seals inwardly against the conduit and outwardly against an inner surface of the opening of the wall, an axial extension of the compressible part is larger than a thickness of the wall at the opening of the wall, and a plurality of fasteners peripherally oriented around the central through opening of the seal.

\* \* \* \* \*